(12) United States Patent
Alnatsheh et al.

(10) Patent No.: US 10,168,857 B2
(45) Date of Patent: Jan. 1, 2019

(54) VIRTUAL REALITY FOR COGNITIVE MESSAGING

(71) Applicant: INTERNATIONAL BUSINESS MACHINES CORPORATION, Armonk, NY (US)

(72) Inventors: Feras N. Y. Alnatsheh, Brooklyn, NY (US); Lisa Seacat DeLuca, Baltimore, MD (US); Pooja M. Kotecha, Beacon, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/334,954

(22) Filed: Oct. 26, 2016

(65) Prior Publication Data

US 2018/0113594 A1    Apr. 26, 2018

(51) Int. Cl.
*G06T 19/00* (2011.01)
*G09G 5/00* (2006.01)
(Continued)

(52) U.S. Cl.
CPC .......... *G06F 3/04815* (2013.01); *H04L 51/04* (2013.01); *H04L 67/38* (2013.01); *H04W 4/50* (2018.02)

(58) Field of Classification Search
CPC .................................................... G06T 19/006
(Continued)

(56) References Cited

U.S. PATENT DOCUMENTS 8,341,022 B2    12/2012   Edwards
8,542,250 B2 *   9/2013   Baseley .................. G06T 19/00
                                                              345/419
(Continued)

FOREIGN PATENT DOCUMENTS

EP         2930671        10/2015

OTHER PUBLICATIONS

Steed et al., "An "In the Wild" Experienced on Presence and Embodiment using Consumer Virtual Reality Equipment", IEEE Transactions on Visualization and Computer Graphics, vol. 22, Iss. 4, Apr. 21, 2016, 9 pages.
(Continued)

*Primary Examiner* — Yi Yang
(74) *Attorney, Agent, or Firm* — Isaac Gooshaw; Andrew D. Wright; Roberts Mlotkowski Safran Cole & Calderon, P.C.

(57) ABSTRACT

Systems and methods for virtual reality cognitive messaging are disclosed. In embodiments, a computer-implemented method, comprises: obtaining, by a computing device, a virtual reality space based on a physical venue; creating, by the computing device, an enhanced virtual reality space by inserting one or more colliders into the virtual reality space, wherein the placement of the one or more colliders in the enhanced virtual reality space maps to a placement of one or more beacons in the physical venue; initiating, by the computing device, a virtual tour of the enhanced virtual reality space; sensing, by the computing device, that a virtual user has collided with one of the one or more colliders in the enhanced virtual reality space during the virtual tour; and sending, by the computing device, a request for event information associated with the one or more beacons in the physical venue to a messaging server.

20 Claims, 6 Drawing Sheets

(51) Int. Cl.
*G06F 3/0481* (2013.01)
*H04L 29/06* (2006.01)
*H04L 12/58* (2006.01)
*H04W 4/50* (2018.01)

(58) Field of Classification Search
USPC ........................................................ 345/633
See application file for complete search history.

(56) References Cited

U.S. PATENT DOCUMENTS

| | | | | |
|---|---|---|---|---|
| 8,761,668 B2* | 6/2014 | Park | ............... | H04B 5/00 |
| | | | | 455/41.2 |
| 8,894,492 B2 | 11/2014 | Ackley et al. | | |
| 8,944,928 B2 | 2/2015 | Kaps et al. | | |
| 9,041,739 B2 | 5/2015 | Latta et al. | | |
| 9,082,149 B2 | 7/2015 | Argue et al. | | |
| 2003/0174178 A1* | 9/2003 | Hodges | ............... | G06Q 30/02 |
| | | | | 715/848 |
| 2004/0203374 A1* | 10/2004 | Zilliacus | ............ | H04M 1/7253 |
| | | | | 455/41.2 |
| 2005/0075116 A1* | 4/2005 | Laird | ............... | A61B 5/04 |
| | | | | 455/456.3 |
| 2007/0192203 A1 | 8/2007 | Di Stefano | | |
| 2009/0063104 A1* | 3/2009 | Jo | ............... | G06F 17/50 |
| | | | | 703/1 |
| 2010/0306120 A1 | 12/2010 | Ciptawilangga | | |
| 2013/0080348 A1* | 3/2013 | Pantaliano | ............ | G06Q 30/02 |
| | | | | 705/347 |
| 2013/0339906 A1 | 12/2013 | Barthelt et al. | | |
| 2014/0012417 A1* | 1/2014 | Zelivinski | ............ | H04N 21/214 |
| | | | | 700/257 |
| 2014/0156396 A1* | 6/2014 | deKozan | ............ | G06Q 30/0261 |
| | | | | 705/14.53 |
| 2014/0361976 A1* | 12/2014 | Osman | ............... | G02B 27/0172 |
| | | | | 345/156 |
| 2015/0015609 A1* | 1/2015 | Plasse | ............... | G01C 21/20 |
| | | | | 345/633 |
| 2015/0091780 A1* | 4/2015 | Lyren | ............... | G02B 27/017 |
| | | | | 345/8 |
| 2015/0123966 A1 | 5/2015 | Newman | | |
| 2015/0170256 A1* | 6/2015 | Pettyjohn | ............ | G06Q 30/0639 |
| | | | | 705/14.49 |
| 2015/0193982 A1 | 7/2015 | Mihelich et al. | | |
| 2015/0281566 A1 | 10/2015 | Rav-Acha et al. | | |
| 2016/0048203 A1 | 2/2016 | Blum et al. | | |
| 2016/0148417 A1* | 5/2016 | Kim | ............... | G06T 19/006 |
| | | | | 345/419 |

OTHER PUBLICATIONS

Guidi et al.,"Virtual Reality for Retail", VSMM IEEE 16th International Conference on, Oct. 20-23, 2010, 4 pages.
Li et al.,"Registration Correction for Augmented Reality in E-Commerce", IEEE International Conference on, Sep. 20-22, 2009, 4 pages.
"Walkbase Technology Real-Time Processing of In-Store Data", http://www.walkbase.com/real-time-processing-of-in-store-data, Walkbase, accessed Oct. 25, 2016, 11 pages.

\* cited by examiner

```
public class ColliderListener : MonoBehaviour {
// Represent Location enter events
void OnTriggerEnter (Collider other){
// determine if a marketing campaign is associated with the real zone
HTTP.Request campaignsRequest = new HTTP.Request( "get", "
http://api.mce.ibm.com/user/" + userId + "/beaconId/
" + beaconId + "/event/enter/campaigns" );
someRequest.Send();
JSONObject campaign = new JSONObject( request.response.Text );
}
// Represent Location Dwell
void OnTriggerStay (Collider other){ }
// Represent Location Exit event
void OnTriggerExit (Collider other){ }
}
```

FIG. 4

```
{
"tenant_code":"1s4t06sd",
"org":{
"name":"CityCool",
"description":"The city cool application",
"registrationTypes":[
"Internal",
"External"
],
"publicKey":""
},
"site":{
"name":"SFMarketStreet",
"address":{
"street":"435 Market Street",
"city":"San Francisco",
"state":"CA",
"zip":"15024",
"country":"United States"
},
"timeZone":"GMT-08:00",
"virtual": true
"description":null
},
"floor":{
"name":"First Floor",
"z":1
},
"zone":{
"name":"Family Room",
"x":556,
"y":399,
"width":192,
"height":202,
"tags":[
"tv",
"entertainment",
"family"
]
},
"zone_code":"mem0t8y",
"zoneTags":[
"tv",
```

```
"entertainment",
"family"
],
"site_code":"0mv0n1m",
"siteTags":[
],
"org_code":"mtq0rsb",
"floor_code":"zwm0br2",
"detected_timestamp":1438888683329,
"device_descriptor":"d73afd8a3f1c68c5aa1d1f
89c873bf1020e2c011",
"registered":false,
"registrationType":"anonymous",
"x":565,
"y":397,
"rssi":-81,
"accuracy":1.5653695493366995,
"dwellPeriod":21215,
"dwellId":"cf965340-3c6f-11e5-9c94-
89a0d9b3cece",
"state":2,
"@docType":"RealTimeEvent",
"activity":"dwell", "device":{
"data":{
},
"unencryptedData":{
"MCEuserId":"Q02lNnVXbdNevxR9",
"MCEchannelId":"VxY4Eood",
"MCEappKey":"gcXmhwg5vf"
},
"registrationType":"External",
"descriptor":"d73afd8a3f1c68c5aa1d1f89c873
bf1020e2c011",
"consentTypes":{
"track":false
},
"registered":true,
"name":"PIMCE-main2015-08-06_14:28:11"
}
```

FIG. 5

```
"site":{
"name":"SFMarketStreet",
"address":{
"street":"435 Market Street",
"city":"San Francisco",
"state":"CA",
"zip":"15024",
"country":"United States"
},
"timeZone":"GMT-08:00",
"virtual": true
"description":null
},
```

VIRTUAL REALITY FOR COGNITIVE MESSAGING

BACKGROUND

The present invention relates generally to dynamic messaging and, more particularly, to virtual reality cognitive messaging.

Today, businesses can define their physical venues with location management tools, and define in-venue marketing zones that can be monitored for business level actions such as entry, exit, and dwell events by their customers. Such location management tools may be used to implement campaigns (e.g., marketing campaigns), whereby a customer entering a venue, exiting a venue, or positioned at a particular zone in a venue, may trigger an event and be sent event material via a message to their mobile device. However, marketing managers or other campaign participants remote from a physical venue may not be able to physically walk through the venue and experience the marketing campaign. Thus, the evaluation of a site-specific campaign by business personnel may not be readily achievable or practical.

SUMMARY

In an aspect of the invention, a computer-implemented method includes: obtaining, by a computing device, a virtual reality space based on a physical venue; creating, by the computing device, an enhanced virtual reality space by inserting one or more colliders into the virtual reality space, wherein the placement of the one or more colliders in the enhanced virtual reality space maps to a placement of one or more beacons in the physical venue; initiating, by the computing device, a virtual tour of the enhanced virtual reality space; sensing, by the computing device, that a virtual user has collided with one of the one or more colliders in the enhanced virtual reality space during the virtual tour; and sending, by the computing device, a request for event information associated with the one or more beacons in the physical venue to a messaging server.

In another aspect of the invention, there is a computer program product for virtual reality cognitive messaging. The computer program product comprises a computer readable storage medium having program instructions embodied therewith. The program instructions are executable by a computing device to cause the computing device to: create an enhanced virtual reality space by inserting one or more colliders into a virtual reality space, wherein the placement of the one or more colliders in the enhanced virtual reality space maps to a placement of one or more beacons in a corresponding physical venue; initiate a virtual tour of the enhanced virtual reality space by a user; sense a triggering event within the enhanced virtual reality space; generate a request for event information associated with the one or more beacons in the physical venue based on the sensing the triggering event; receive event information associated with the physical venue based on the request for event information; and display content to the user based on the event information.

In another aspect of the invention, there is a system for virtual reality cognitive messaging. The system includes a CPU, a computer readable memory and a computer readable storage medium associated with a computing device. The system further includes: program instructions to create an enhanced virtual reality space by inserting one or more colliders into a virtual reality space, wherein the placement of the one or more colliders in the enhanced virtual reality space maps to a placement of one or more beacons in a corresponding physical venue; program instructions to initiate a virtual tour of the enhanced virtual reality space by a user; program instructions to sense a triggering event within the enhanced virtual reality space; program instructions to send a request for marketing information associated with the one or more beacons in the physical venue to a messaging server based on the sensed triggering event; program instructions to receive marketing event information associated with the physical venue based on the request for marketing information; and program instructions to display marketing content to the user based on the marketing event information; wherein the program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to dynamic marketing and, more particularly, to virtual reality cognitive marketing. In embodiments, a cognitive marketing virtual reality system enables marketers to cognitively trigger location-based events and experience and interact with marketing campaigns as if they were in the actual physical venue associated with the marketing campaign. In aspects, in-store mobile location events associated with the marketing campaign are triggered in a virtual environment and viewed by users in a manner that mirrors the experience of a user physically present at the venue. In embodiments, the physical marketing campaigns are associated with colliders in the virtual environment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
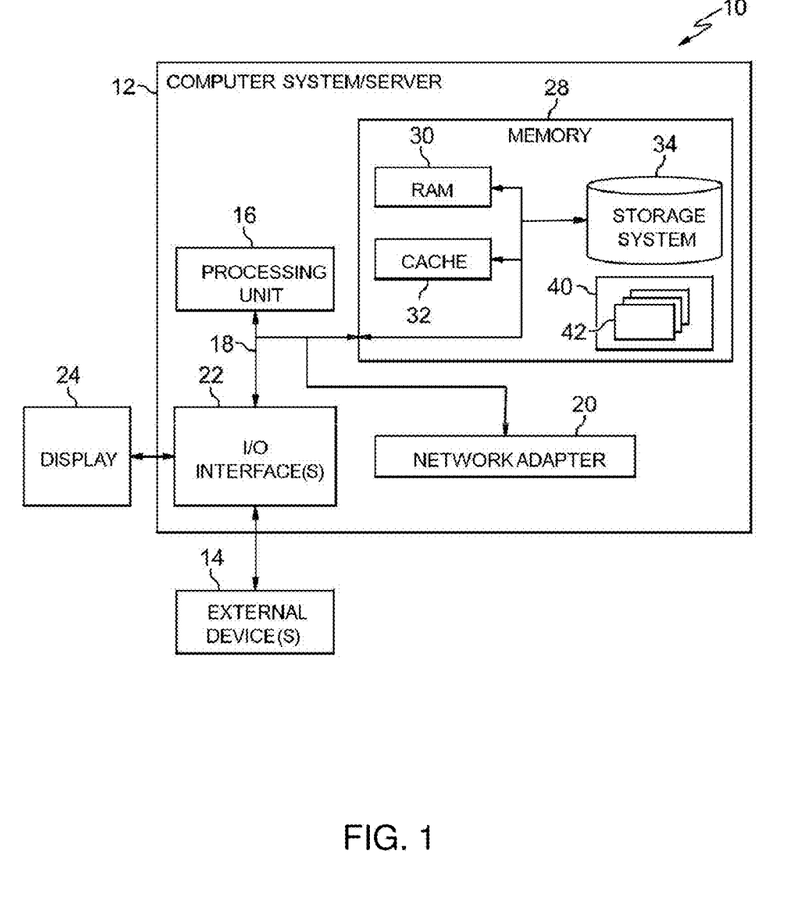
FIG. 1 depicts a computing infrastructure according to an embodiment of the present invention.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
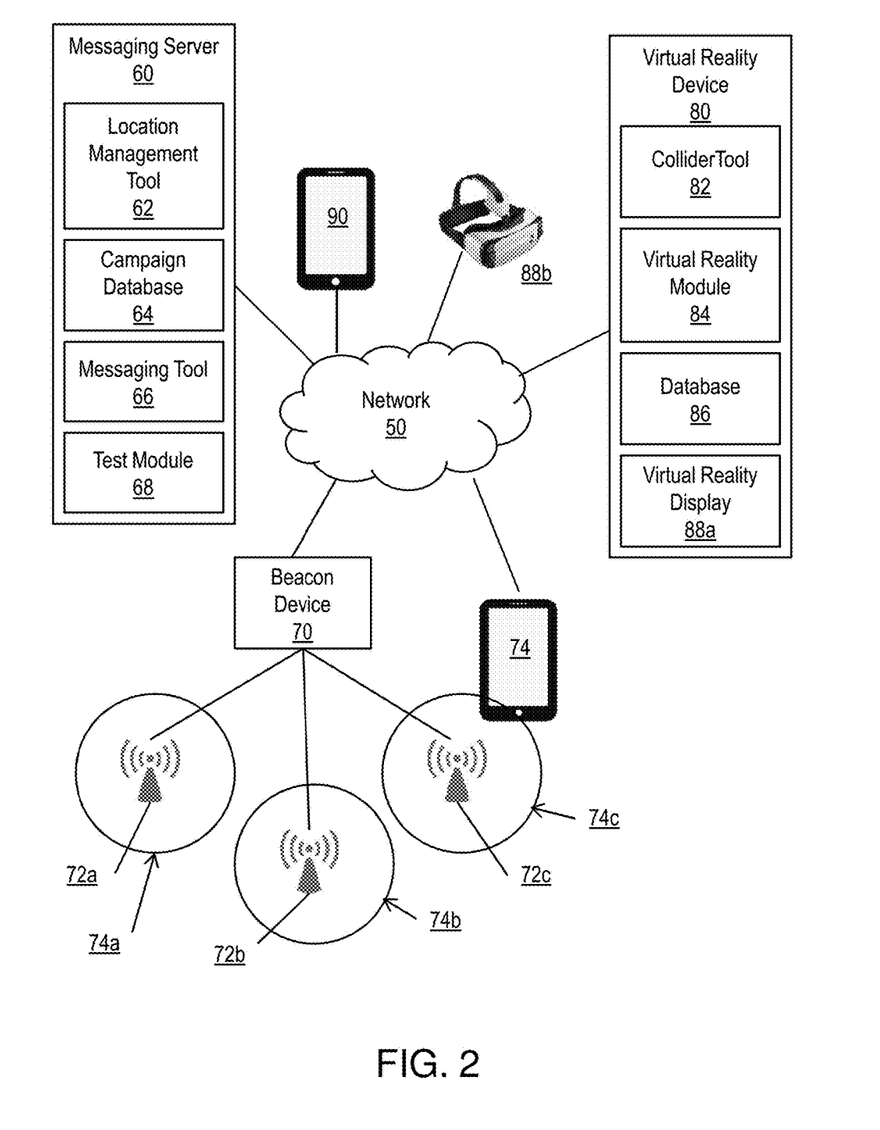
FIG. 2 shows an exemplary environment in accordance with aspects of the invention.

FIG. 2 shows an exemplary environment in accordance with aspects of the invention. The environment includes a messaging server 60 (e.g., a web server) connected to a network 50. The messaging server 60 may comprise a computer system 12 of FIG. 1, and may be connected to the network 50 via the network adapter 20 of FIG. 1. The messaging server 60 may be configured as a special purpose computing device that is part of a marketing provider's infrastructure. The messaging server 60 may include a location management tool 62 for creating a digital floor plan for a physical venue and zone definitions for a campaign (e.g., marketing campaign). The messaging server 60 may also include a campaign database 64 for storing campaign data, as well as a messaging tool 66. The messaging tool 66 may include one or more program modules (e.g., program module 42 of FIG. 1) executed by the messaging server 60. In embodiments, the messaging tool 66 is configured to identify triggering events by users at a venue, or by virtual users, and send an associated campaign event to the user's device. The messaging server 60 may also include a test module 68 having one or more program modules executed by the messaging server 60 to enable testing of various aspects of campaign events.

The network 50 may be any suitable communication network or combination of networks, such as a local area network (LAN), a general wide area network (WAN), and/or a public network (e.g., the Internet). In aspects, the messaging server 60 is in communication with a beacon device 70 at a physical venue. The beacon device 70 is in communication with one or more beacons at the physical venue, represented in FIG. 2 at 72a-72c. The beacon device 70 may be in wireless communication with the beacons 72a-72c, or may be in communication with beacons 72a-72c through a network connection (not shown). Beacon device 70 may be configured as a special purpose computing device for receiving and managing beacon signals at a physical venue, and communicating with the messaging server 60. Beacons 72a-72c may be any variety of conventional positioning and counting technology, such as Wi-Fi, Bluetooth beacons, cameras and beam counters utilized in a physical venue for campaigns and the like. In aspects, beacons 72a-72c have a working range represented by circles 74a-74c in FIG. 2. For example, a Bluetooth beacon may have a broadcast range of 1-10 meters. In embodiments, beacons 72a-72c send notifications of triggering events to the messaging tool 66, which then determines if an associated campaign stored in the campaign database 64 should be sent (i.e., a message sent) to an in-venue user device, such as mobile user device 74.

Still referring to FIG. 2, a virtual reality device 80 may comprise components of the computer system 12 of FIG. 1, and may be connected to the network 50 via the network adapter 20 of FIG. 1. The virtual reality device 80 may be configured as a special purpose computing device that is part of a service provider's infrastructure. In aspects, the virtual reality device 80 includes a collider tool 82. The collider tool 82 may include one or more program modules (e.g., program module 42 of FIG. 1) executed by the virtual reality device 80. In embodiments, the collider tool 82 is configured to create colliders in a virtual reality space or environment that reflect the placement of the one or more beacons 72a-72c in an associated physical venue floor plan. In other words, the placement of colliders in the virtual reality space maps to the beacons 72a-72c in the associated physical venue. The virtual reality device 80 may also include a virtual reality module 84. The virtual reality module 84 may include one or more program modules executed by the virtual reality device 80 for creating virtual reality spaces from digital floor plans. In aspects the virtual reality device 80 may include a database 86 for storing virtual reality space and physical venue information.

In embodiments, when virtual beacons (not shown) are triggered in a virtual reality space, notifications of the triggering event are sent to the messaging tool 66, which then determines if an associated campaign stored in the campaign database 64 should be sent (i.e., a message sent) to a remote user device, such as a mobile device 90, or one of virtual reality displays 88a, 88b.

The mobile user device 74 may be any general purpose computing device configured to receive streams of data for visual display, such as a smartphone, a personal digital assistant, a tablet computer, or a wearable device. Likewise, the remote user device 90 may be any general purpose computing device located remote from the physical venue that is configured to receive streams of data for visual display, such as a smartphone, a personal digital assistant, a tablet computer, a wearable device, a personal computer, or the like.

Figure 3:
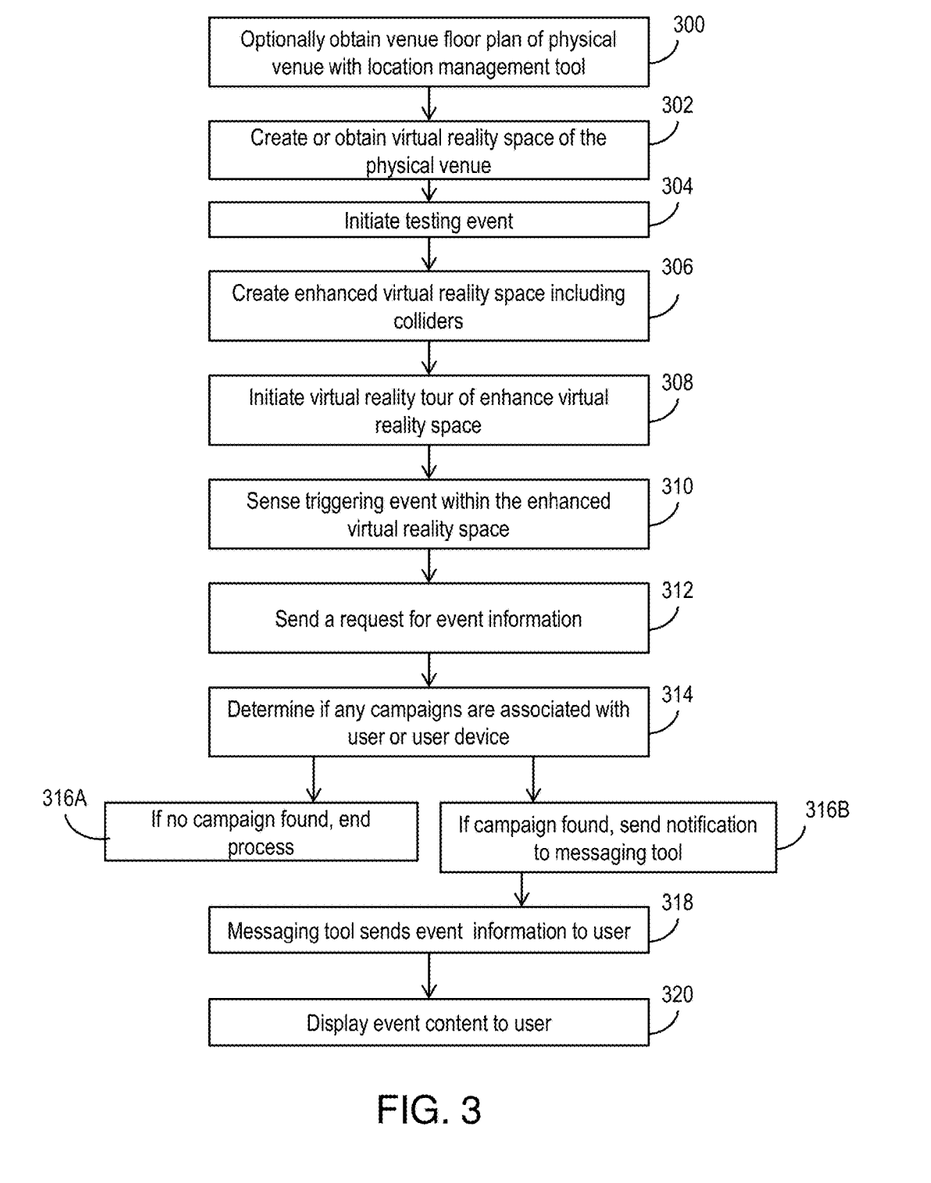
FIG. 3 shows a flowchart of steps of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2.

Optionally, at step 300 a digital floor plan of a physical venue is obtained by the virtual reality device 80 from the messaging server 60 or another source. The floor plan may be created by marketing providers using a conventional location management tool 62. It should be understood that the originators of the floor plan may be the owners of the messaging server 60, an owner of the virtual reality server 80, or a third party provider.

A number of conventional location management tools for on-site marketing may be utilized to create floor plans of a physical venue having defined zones for locating beacons 72a-72c. In conventional on-site marketing systems, a user or a user's device may be detected by beacons 72a-72c set up in the physical venue, which triggers an event (e.g., a marketing event), whereby user or user device data is sent to a messaging server (e.g., messaging server 60). In response, the messaging server 60 utilizes the user data to determine if there is an associated campaign stored in an associated campaign database (e.g., campaign database 64). If the messaging server 60 identifies a campaign associated with the user or user device (e.g., user category), the messaging tool 66 is notified, and sends an event (event message) associated with the campaign to the user's mobile device 74. By way of example, a beacon 72a may be in the form of a Bluetooth beacon that recognizes the arrival of a user's mobile device 74 within a predefined zone 74a of a physical venue. See the example depicted in FIG. 2. The Bluetooth beacon 72a may then send a signal to the messaging server 60, which recognizes the presence of the user's mobile device 74, and determines that a campaign is appropriate for the user of the mobile device 74 based on user or user device information stored in the campaign database 64. The messaging tool 66 would then be notified, and would send an appropriate marketing event (marketing event message) associated with the campaign to the mobile device 74, such as a coupon or sale offer.

The messaging server 60 referenced herein may be utilized to conduct any suitable on-site mobile device marketing, and is not limited to the on-site marketing example provided herein. In aspects of the present invention, the messaging server 60 is a specialty computer device configured for use with a virtual reality device 80 of the present invention, to provide virtual reality cognitive marketing in accordance with the present invention.

At step 302, a virtual reality space is obtained. Optionally, the virtual reality space may be obtained at step 302 by creating the virtual reality space based on a floor plan obtained at step 300, including virtual reality beacons that mirror the beacons at the physical venue (e.g., 72a-72c). In embodiments, the virtual reality space is created by the virtual reality module 84 of the virtual reality server 80 utilizing conventional virtual reality technologies. The virtual reality space may be a 3-dimensional space, or a flat 2-dimensional space. Alternatively, a virtual reality space based on the physical venue associated with the on-site marketing referenced above is obtained from a third party source. The virtual reality space may be created by marketing providers, such as the owners of the messaging server 60, by an owner of the virtual reality server 80, or by a third party provider. It should be understood that the manner in which the virtual reality space is created is not intended to limit the present invention.

At optional step 304, the testing module 68 is utilized to initiate tests of various aspects of campaigns (e.g., marketing campaigns) and beacon locations. For example, the testing module may be utilized to initiate tests of any virtual reality spaces created in order to ensure that the virtual reality spaces accurately represent the associated physical venue and placement of beacons at the physical venue.

Figure 4:
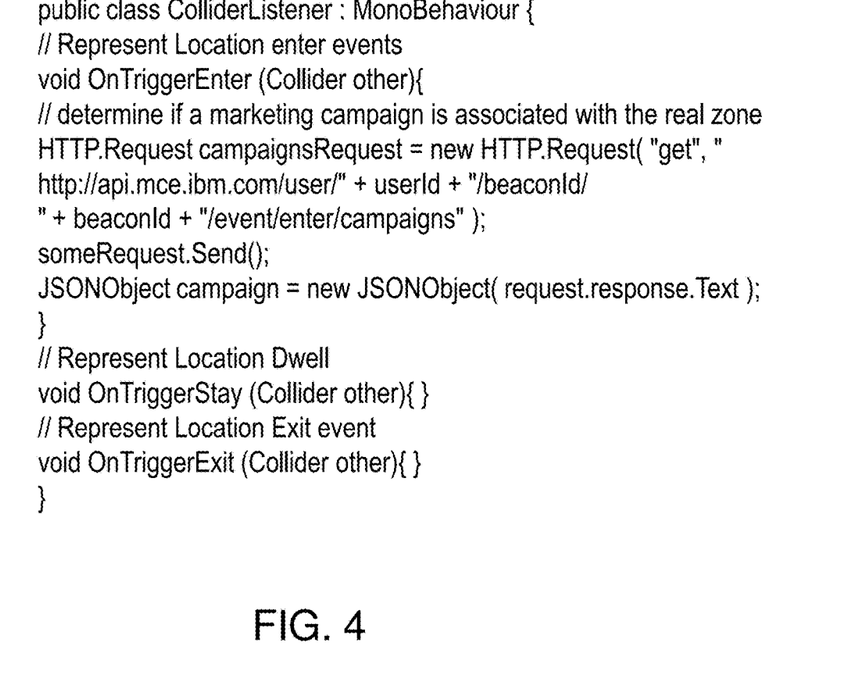
FIG. 4 shows exemplary programming code in accordance with aspects of the invention.

At step 306 the collider tool 82 is utilized to insert one or more colliders into the virtual reality space from step 302 to produce an enhanced virtual reality space. In aspects, a collider is generated for each beacon present in the corresponding physical venue. As used herein, the term collider means a virtual object or space that, once collided with in the enhanced virtual reality space, triggers something to occur. In embodiments, a collider is inserted to mirror the range of an on-site beacon (e.g., 72a-72c) in the corresponding physical space. For example, if a beacon has a working range of 10 meters, the collider inserted into the virtual reality space will be represented by a circle or sphere collider having a scaled perimeter (diameter) to be equal to 10 meters in the virtual reality space. In another example, one or more colliders inserted into the virtual reality space are polygons each having a scaled perimeter to match a range of the one of more beacons in the physical venue. An example of program code for collider setup within the virtual reality space is depicted in FIG. 4.

At step 308, the virtual reality device 80 initiates a tour of the enhanced virtual reality space. In embodiments, data associated with the enhanced virtual reality space is sent from the virtual reality device 80 through a network connection 50 to a remote virtual reality device 88b to be experienced by a user. In embodiments, data associated with the enhanced virtual reality space is sent from the virtual reality device 80 to a virtual reality display 88a via a direct connection. Conventional virtual reality systems can be utilized to implement step 308 using the virtual reality device 80. By way of example, a user can utilize a conventional virtual reality headset (e.g., 88b) to tour the enhanced virtual reality space of the present invention.

At step 310, the virtual reality device 80 senses a triggering event by the user within the enhanced virtual reality space. In aspects the triggering event triggers an event (e.g., marketing event) within the enhanced virtual reality space when the user virtually collides with a collider within the enhanced virtual reality space.

Figure 5:
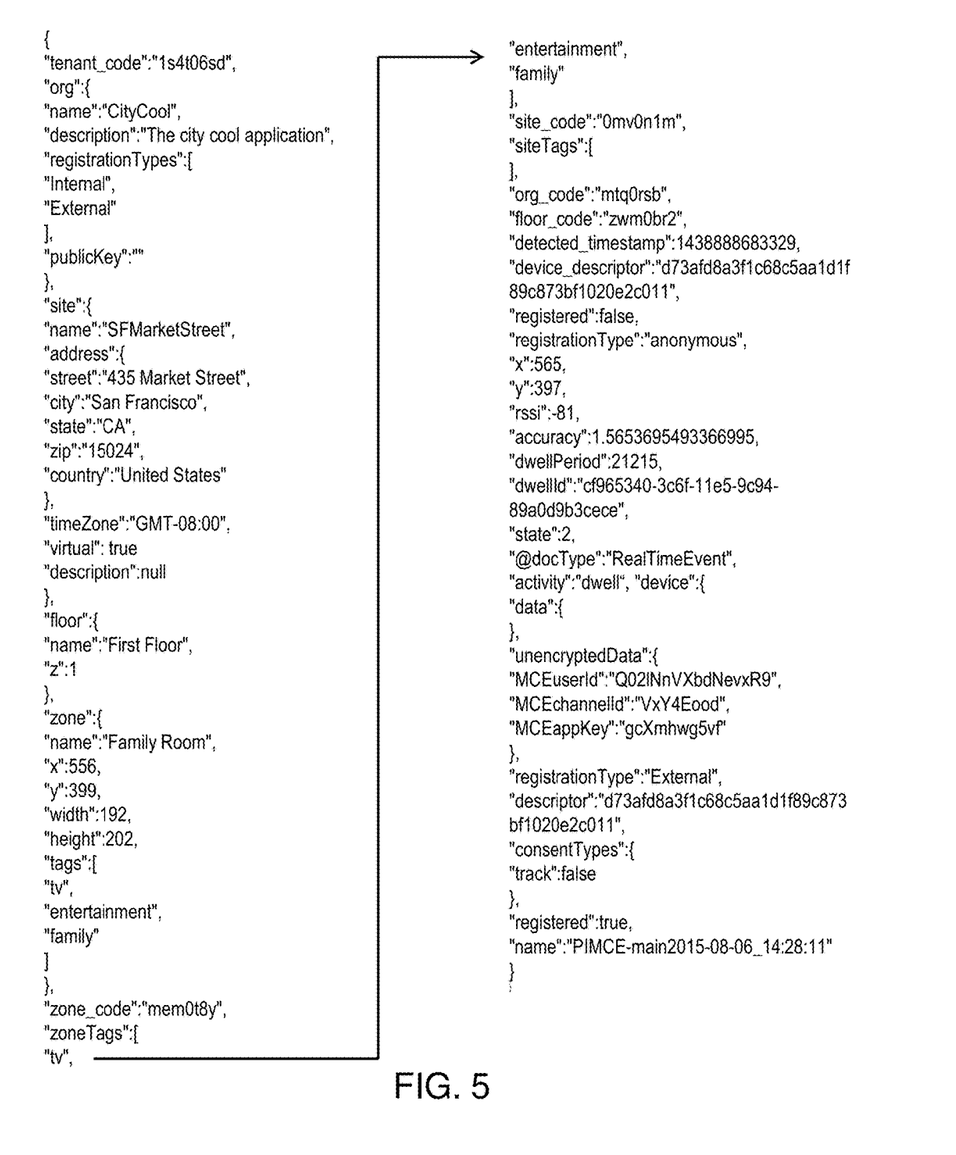
FIG. 5 shows exemplary programming code in accordance with aspects of the invention.

At step 312, the virtual reality device 80 sends a request for event information (e.g., marketing information) to the messaging server 60 in response to the sensed triggering event of step 310. In aspects, the request conveys information regarding the user or a device associated with the user (e.g., virtual reality device 80, mobile device 90), the physical venue associated with the enhanced virtual reality space, and the at least one collider of step 310. An example of program code for payload integration for a virtual reality space is depicted in FIG. 5.

At step 314, the messaging server 60 determines if there are any campaigns associated with the enhanced virtual reality space based on the request data received from the virtual reality device 80. In aspects, the messaging server 60 determines if any campaigns are associated with the enhanced virtual reality space by determining if the physical venue upon which the enhanced virtual reality space is based is associated with any campaigns. Accordingly, any campaigns for the physical venue are determined to be associated with the related enhanced virtual reality space. In embodiments, step 314 comprises the messaging server 60 comparing information received from the request of step 312 with a look-up table in the campaign database 64 to determine if any campaigns stored in campaign database 64 are associated with the physical venue upon which the enhanced virtual reality space is based.

At step 316A, if the messaging server 60 determines that no campaigns are associated with the enhanced virtual reality space and/or the related physical venue, then no action is taken by the messaging tool 66.

Figure 6:
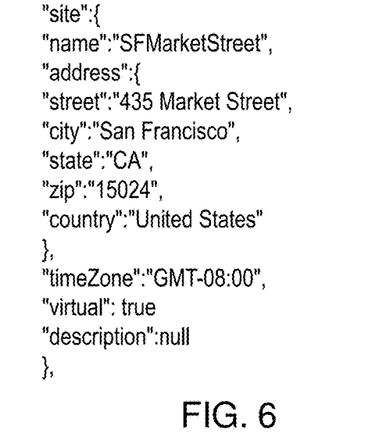
FIG. 6 shows exemplary programming code in accordance with aspects of the invention.

Conversely, at step 316B, if the messaging server 60 determines that one or more campaigns are associated with the enhanced virtual reality space and/or the related physical venue, then at least one notification is sent to the messaging tool 66 by the messaging server 60. In aspects the notification includes information regarding the physical venue along with identifiers indicating that the event was triggered from the related virtual reality space. An example of program code that can be utilized in accordance with step 316B is depicted in FIG. 6.

At step 318, the messaging tool 66 sends an event (e.g., marketing event) to a user, either directly through a mobile device (e.g., mobile device 90) or through the virtual reality device 80.

At step 320, marketing content of the event is displayed to the remote user through one or more user devices (e.g., virtual reality displays 88a, 88b or remote mobile device 90). For example, the messaging tool 66 may send event information (e.g, marketing event information) to the virtual reality device 80, which would then display event content (e.g., marketing event content) to a user through the virtual reality display 88a.

Figure 7:
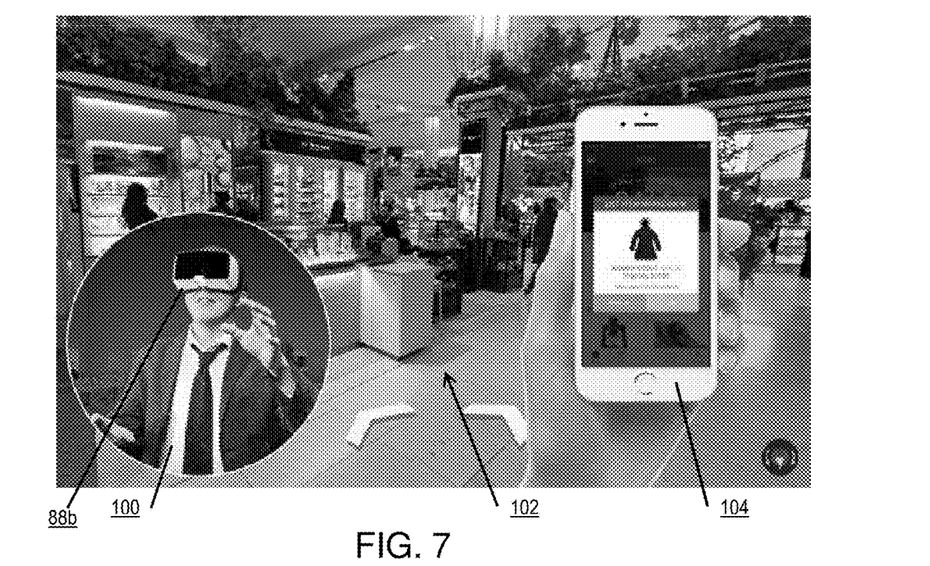
FIG. 7 depicts the experience of a user viewing an enhanced virtual reality space in accordance with embodiments of the invention.

FIG. 7 depicts the experience of a user 100 (e.g., a user remote from the physical venue of interest) viewing an enhanced virtual reality space 102 through a virtual reality headset 88b. In the example depicted, the event triggered by the user at step 310 is presented to the user through the virtual reality headset 88b, whereby the user views the event content on a virtual mobile device 104. In this way, the user 100 can experience, via the enhanced virtual reality space 102, the same campaign (e.g., marketing campaign) that an on-site user at the physical venue would experience. Alternatively, the event triggered by the user at step 310 may be presented to the user via a remote mobile device 90 in the same manner that the event would be displayed to a user through an on-site mobile device 74 if they had triggered the event through on on-site beacon (e.g., 72a-72c).

Advantageously, the system of the present invention reducing computing overhead (i.e., consumption of computing resources) by enabling a messaging server (e.g., messaging server 60) to provide the same campaign experience to both on-site users (at a physical venue) and remote virtual users (such as a regional manager of the physical venue). For example, the present invention leverages campaign information from campaign database 64 for both on-site marketing and virtual marketing, thus increasing the use of the campaign information without requiring additional resources. Moreover, the system of the present invention improves the operation of messaging server (e.g., 60) by adding to the functionality of the messaging server (e.g., enables both on-site and remote virtual marketing campaign distribution).

In embodiments, a service provider, such as a marketing provider, could offer to perform the processes described herein. In this case, the service provider can create, maintain, deploy, support, etc., the computer infrastructure that performs the process steps of the invention for one or more customers. These customers may be, for example, any business that uses on-site mobile device marketing programs. In return, the service provider can receive payment from the customer(s) under a subscription and/or fee agreement and/or the service provider can receive payment from the sale of advertising content to one or more third parties. In one embodiment, a service provider maintains the virtual reality device 80 and the messaging server 60 as a system for providing both virtual cognitive marketing and on-site marketing to consumers. Although depicted as separate systems connected by network 50, it should be understood that virtual reality device 80 and messaging server 60 could be part of the same computer system having various components in direct communication with one another.

In still another embodiment, the invention provides a computer-implemented method for virtual cognitive messaging. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Although embodiments of the present invention are described as sending messages associated with marketing events, it should be understood that other types of information and content (i.e., non-marketing information and content) can be distributed through implementation of the present invention. By way of example, a public library could use the present invention to provide a regional manager with information regarding special library events through a virtual reality interface.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    obtaining, by a computing device, a virtual reality space that is based on a physical venue;
    creating, by a collider tool of the computing device, an enhanced virtual reality space by inserting one or more colliders into the virtual reality space, wherein the placement of the one or more colliders by the collider tool in the enhanced virtual reality space maps to a placement of one or more beacons in the physical venue, and the one or more colliders have a scaled perimeter matching a range of the one or more beacons in the physical venue;
    initiating, by the computing device, a virtual tour of the enhanced virtual reality space by a virtual user remote from the physical venue;
    sensing, by the computing device, that the virtual user has virtually collided with one of the one or more colliders in the enhanced virtual reality space during the virtual tour;
    sending, by the computing device, a request for event information associated with the one or more beacons in the physical venue to a remote messaging server based on the sensing that the virtual user has virtually collided with the one of the one or more colliders, wherein the request includes information regarding the physical venue associated with the virtual reality space, an identifier indicating that an event was triggered in the virtual reality space, and information regarding the one of the one or more colliders;
    receiving, by the computing device, the event information from the remote messaging server based on the request for event information; and
    displaying content associated with the event information to a user of the computing device.

2. The method of claim 1, wherein the event information received by the computing device is identical to event information presented to a user triggering one of the one or more beacons in the physical venue.

3. The method of claim 2, wherein the displaying the content associated with the event information is implemented within the virtual reality space.

4. The method of claim 1, wherein:
    the one or more colliders are selected from the group consisting of sphere colliders and polygon colliders; and
    the one or more colliders are virtual objects or spaces that, once collided with in the enhanced virtual reality space, trigger the sending of the request for event information associated with the one or more beacons in the physical venue upon the sensing that the virtual user has virtually collided with one of the one or more colliders.

5. The method of claim 1, wherein the displaying content comprises displaying the content through a virtual reality headset.

6. The method of claim 1, wherein the content is displayed on a virtual mobile device within the enhanced virtual reality space.

7. A computer program product for virtual reality cognitive messaging, the computer program product comprising a computer readable storage medium having program instructions embodied therewith, the program instructions executable by a computing device to cause the computing device to:
    obtain a digital floor plan of a physical venue;
    create a virtual reality space based on the digital floor plan;
    create an enhanced virtual reality space by inserting one or more colliders into the virtual reality space, the colliders comprising virtual objects that trigger an event when collided with in the enhanced virtual reality space, wherein the placement of the one or more colliders in the enhanced virtual reality space maps to a placement of one or more beacons in the physical venue;
    initiate a virtual tour of the enhanced virtual reality space by a user remote from the physical venue;
    sense a triggering event within the enhanced virtual reality space when the user virtually collides with one of the one or more colliders;
    generate a request for event information associated with the one or more beacons in the physical venue based on the sensing the triggering event, the request including information regarding the physical venue associated with the virtual reality space, an identifier indicating that an event was triggered in the virtual reality space, and information regarding the one of the one or more colliders;
    send the request to a remote messaging server;
    receive event information from the remote messaging server associated with the physical venue based on the request for event information; and
    display content to the user based on the event information, wherein the content is marketing event content identical to marketing event content presented to a user triggering one of the one or more beacons in the physical venue.

8. The computer program product of claim 7, wherein:
    the one or more colliders are selected from the group consisting of sphere colliders and polygon colliders, each having a scaled perimeter to match a range of the one or more beacons in the physical venue; and
    the one or more colliders are virtual objects or spaces that, once collided with in the enhanced virtual reality space, trigger the generation of the request for event information associated with the one or more beacons in the physical venue.

9. The computer program product of claim 7, wherein the inserting one or more colliders into the virtual reality space is conducted using a collider tool of a virtual reality device.

10. The computer program product of claim 9, wherein the displaying the content comprises displaying the marketing content through a virtual reality headset in communication with the virtual reality device.

11. The computer program product of claim 7, wherein the creating the virtual reality space is performed by a virtual reality module of a virtual reality device.

12. The computer program product of claim 7, wherein the floor plan is obtained from a location management tool.

13. The computer program product of claim 7, wherein the program instructions further cause the computing device to:
provide the event information associated with the physical venue to a virtual reality display, wherein the displaying the content to the user is performed by the virtual reality display.

14. The computer program product of claim 7, wherein the displaying the content to the user comprises sending the marketing content to a mobile user device for display.

15. The computer program product of claim 7, wherein the marketing event content is displayed on a virtual mobile device within the enhanced virtual reality space.

16. A system for virtual reality cognitive messaging, comprising:
a CPU, a computer readable memory and a computer readable storage medium associated with a computing device;
program instructions to obtain a digital floor plan of a physical venue;
program instructions to create a virtual reality space based on the digital floor plan;
program instructions to create an enhanced virtual reality space by inserting one or more colliders into the virtual reality space, the colliders comprising virtual objects that trigger an event when collided with in the enhanced virtual reality space, wherein the placement of the one or more colliders in the enhanced virtual reality space maps to a placement of one or more beacons in a corresponding physical venue and the one or more colliders have a scaled perimeter matching a range of the one or more beacons in the physical venue;
program instructions to initiate a virtual tour of the enhanced virtual reality space by a user remote from the physical venue;
program instructions to sense a triggering event within the enhanced virtual reality space upon the user virtually colliding with one of the one or more colliders in the enhanced virtual reality space;
program instructions to send a request for marketing information associated with the one or more beacons in the physical venue to a remote messaging server based on the sensed triggering event, wherein the request includes information regarding the physical venue associated with the virtual reality space, an identifier indicating that an event was triggered in the virtual reality space, and information regarding the one of the one or more colliders, including a beacon identification;
program instructions to receive marketing event information associated with the physical venue from the remote messaging server based on the request for marketing information; and
program instructions to display marketing content to the user based on the received marketing event information, wherein the marketing content is identical to marketing content presented to a user device triggering one of the one or more beacons in the physical venue;
wherein the program instructions are stored on the computer readable storage medium for execution by the CPU via the computer readable memory.

17. The system of claim 16, wherein the one or more colliders are selected from the group consisting of sphere colliders and polygon colliders.

18. The system of claim 16, wherein the inserting one or more colliders into the virtual reality space is performed by a collider tool of a virtual reality device.

19. The system of claim 16, wherein the displaying marketing content comprises displaying the marketing content on a virtual mobile device within the enhanced virtual reality space.

20. The system of claim 16, wherein the displaying marketing content comprises displaying the marketing content on a mobile user device of the user.

* * * * *